United States Patent

Smith

[15] 3,680,676

[45] Aug. 1, 1972

[54] ROLLER GUIDE FOR BOAT TRAILER

[72] Inventor: Raymond P. Smith, 30785 Red Maple Lane, Southfield, Mich. 48075

[22] Filed: April 23, 1971

[21] Appl. No.: 136,850

[52] U.S. Cl. .................................. 193/42, 214/84
[51] Int. Cl. ............................................ B60p 1/52
[58] Field of Search ............... 214/84; 193/35 A, 42

[56] References Cited

UNITED STATES PATENTS 2,960,246   11/1960   Lovelace ........................ 214/84
3,077,276   2/1963   Thwreatt ........................ 214/84

*Primary Examiner*—Albert J. Makay
*Attorney*—Barnes, Kisselle, Raisch & Choate

[57] ABSTRACT

A boat trailer guide roller device with a roller mounted for free rotation on its longitudinal axis and movement transverse to its axis in a frame carried by a base for pivotal movement about an axis generally perpendicular to both the longitudinal axis and direction of transverse movement of the roller. The roller in one transverse position provides a self-centering caster as a boat is loaded and in the other transverse position a nonswiveling roller as the boat is unloaded.

15 Claims, 4 Drawing Figures

PATENTED AUG 1 1972 3,680,676

INVENTOR.
RAYMOND P. SMITH
BY
Barnes, Kisselle, Raisch & Choate
ATTORNEYS

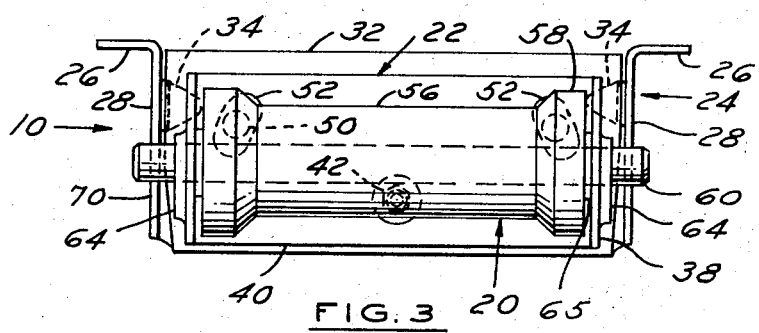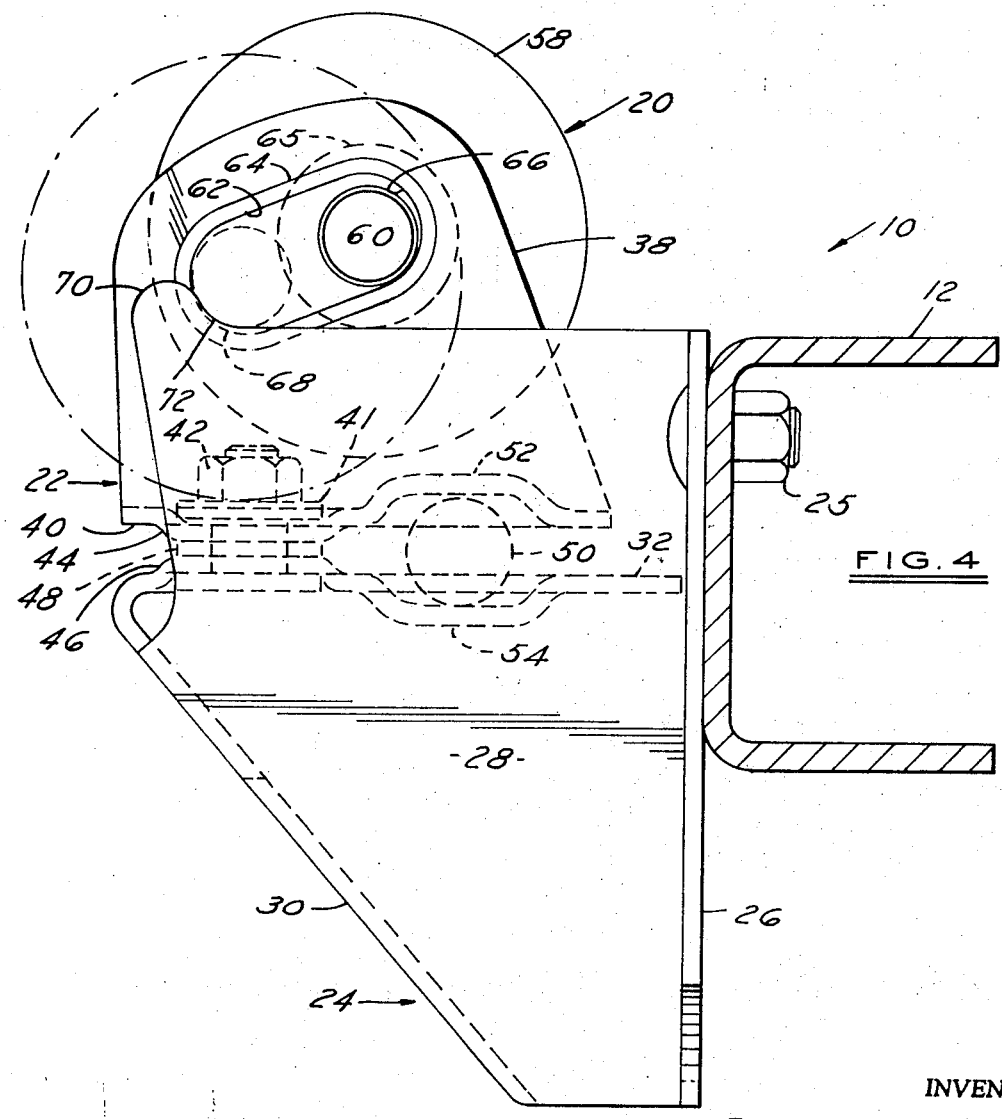

ROLLER GUIDE FOR BOAT TRAILER

This invention relates to guide rollers and more particularly to a boat trailer guide roller device.

Objects of this invention are to provide a guide roller for a boat trailer which automatically provides both a self-centering caster as the boat is loaded and a non-swiveling roller as the boat is unloaded and which is of economical manufacture and assembly and relatively maintenance-free.

These and other objects, features and advantages will be apparent from the following description and accompanying drawings in which:

FIGS. 2 and 3 are a rear elevation and plan view, respectively, of the guide roller of FIG. 1. FIG. 4 is a side view of the guide roller of FIG. 1 mounted on a rear crossmember of the boat trailer.

REFERRING TO THE DRAWINGS

Figure 1:
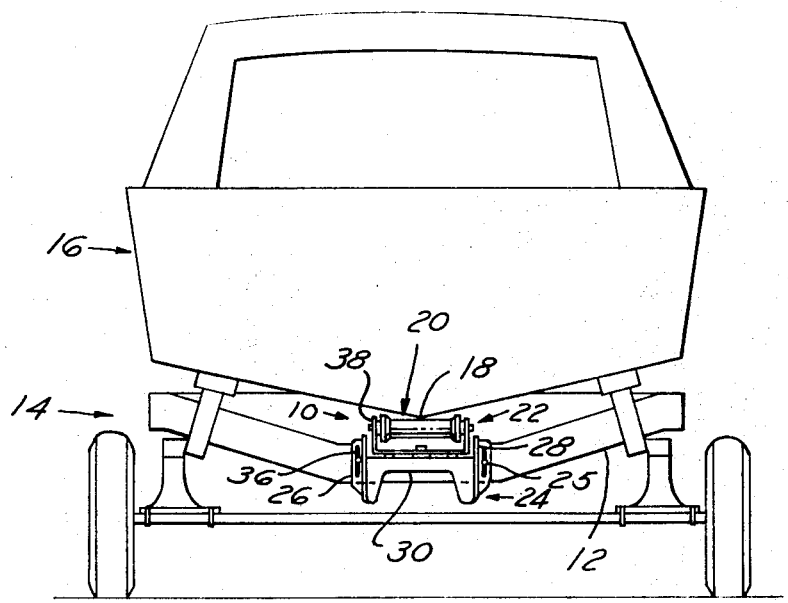
FIG. 1 is a rear elevation of a boat loaded on a boat trailer with the guide roller invention mounted thereon.

FIG. 1 illustrates a guide roller device 10 embodying this invention mounted on a rear crossmember 12 of a boat trailer 14. A boat 16 is loaded on trailer 14 with its keel 18 resting on roller device 10. Device 10 has a roller 20 mounted in a swivel frame 22 carried by a base 24 adjustably secured to crossmember 12 by bolts 25.

Figure 2:
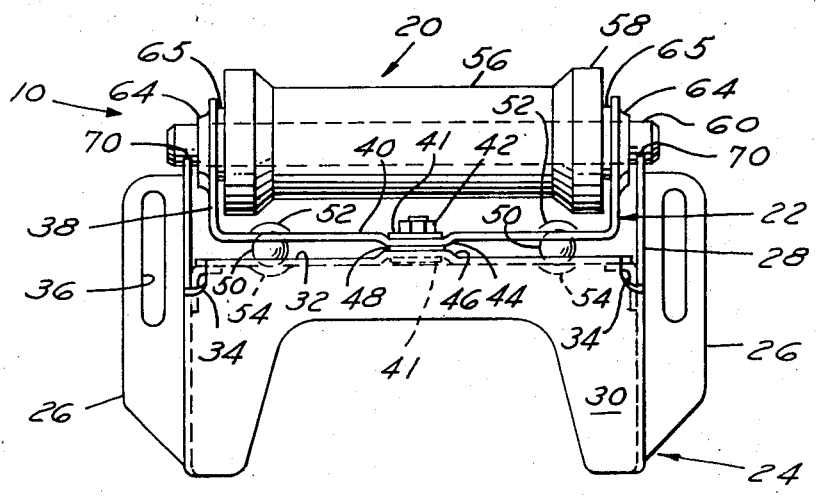

As shown in FIGS. 2, 3 and 4, base 24 is a one-piece sheet metal stamping with mounting flanges 26 and spaced generally opposed flat sidewalls 28 extending perpendicular to the flanges and interconnected by an inclined front panel 30. Panel 30 has an integral tongue folded between the sidewalls to provide a generally horizontal mounting plate 32 the free end of which is supported by L-shaped brackets 34 fixed to walls 28. To facilitate adjusting the vertical mounting position of base 24, elongate slots 36 are provided in flanges 26. Swivel frame 22 is a generally U-shaped sheet metal bracket with opposed spaced sidewalls 38 interconnected by an integral base plate 40. Swivel frame 22 is mounted for pivotal movement on base 30 by washers 41 and a nut and bolt 42 extending through mating bosses 44 and 46 in base plate 40 and mounting plate 32. A spacer washer 48 of a low friction material such as nylon assures an easy swivel movement of frame 22. The arcuate movement or extent to which frame 40 can swivel from its center position is limited by ballbearings 50 received in generally opposed pockets 52 and 54 in base plate 40 and mounting plate 32. The arrangement of pockets 52, 54 and ballbearings 50 provides additional points of support for swivel frame 22 and the pockets extend longitudinally on an arc or radius about the pivot point provided by bolt 42 to facilitate a free-swiveling movement of the frame within the limits controlled by the pockets and ballbearings.

Roller 20 is mounted in frame 22 for both rotation on its longitudinal axis which is generally perpendicular to the pivotal axis of frame 22 and movement in a direction generally transverse to both the longitudinal and pivotal axes. Roller 20 has a spool 56 with retaining shoulders 58 fixed to a longitudinally extending pin 60. The opposed ends of pin 60 are freely received for rotation and transverse movement in elongate slots 62 with peripheral flanges 64 in sidewalls 38 of swivel frame 22. Roller 20 is spaced between sidewalls 38 by washers 65. Peripheral flanges 64 provide additional bearing or support area for pin 60 and if stamped from sheet metal a cold worked and thus, stress hardened bearing surface with improved wear properties. Slots 62 preferably slope slightly upwardly and have generally semicircular upper and lower ends 66 and 68. Roller 20 is prevented from swiveling when pin 60 is in the lower ends 68 of slots 62 by positive stops 70 on the upper edges of sidewalls 28 of base 24. The arcuate portions 72 of stops 70 conform generally with the curvature of pin 60 and are positioned slightly above the lowermost portion of lower ends 68 of slots 62. This position of arcuate portions 72 transmits the load carried by roller 20 directly to frame 24 when the roller is in the lower ends 68 of slots 62.

In using guide roller 10, it is mounted on the rear of boat trailer 14 and vertically positioned for rolling engagement with the keel 18 of a boat 16 to be loaded on the trailer. As boat 16 moves forward from the rear onto trailer 14, the engagement of keel 18 with roller 20 shifts pin 60 transversely in slots 62 from lower ends 68 to upper ends 66 of the slots as shown in the phantom and solid line positions in FIG. 4. This transverse movement of pin 60 disengages the pin from stops 70 which allows frame 22 to freely swivel about the pivot point of bolt 42 within the limits of arcuate movement determined by pockets 52, 54 and ballbearings 50. This swiveling movement of roller 20 and frame 22 facilitates loading boat 16 on trailer 14. As boat 16 moves forward, keel 18 tends to be centered on roller 20 because the longitudinal axis of pin 60 is located transversely ahead of the pivot point of swivel frame 22 provided by bolt 42. After boat 16 is loaded on trailer 14 the dead weight of the boat and vibration from moving the trailer will cause roller 20 to move to the lower ends 68 of slots 62 and into engagement with stops 70 which will transmit the load carried by the roller directly to base 24 instead of being transmitted through swivel frame 22 and ballbearings 50 to the base. When boat 16 is removed rearwardly from trailer 14, roller 20 is urged transversely rearwardly so that pin 60 is received in the lower ends 68 of arcuate slots 62. Roller 20 is prevented from swiveling as boat 16 is removed from trailer 14 because the ends of pin 60 are urged into engagement with and bear on stops 70 of base 24.

This roller guide invention facilitates loading and unloading of boats on boat trailers by providing both a self-centering caster or roller as the boat is loaded and a nonswiveling roller when the boat is unloaded and can be constructed primarily from a few sheet metal stampings and thus, is of economical manufacture and assembly and is substantially maintenance-free.

I claim:

1. A guide roller device for a boat trailer comprising:
   a base,
   a frame carried by said base for pivotal movement about an axis with respect to said base,
   a guide roller carried by said frame for pivotal movement therewith and for rotation about an axis generally perpendicular to the axis about which said frame pivots, said roller also being carried by said frame for movement to first and second spaced positions in a direction generally transverse to both said axis of rotation of said guide roller and said pivotal axis of said frame, stops carried by said base and adapted to engage said roller and prevent pivotal movement of said roller when said roller is in said first position and to disengage from said roller and to allow said roller to pivot with said frame when said roller is in said second position, whereby when a boat moves in one direction on said roller, said roller moves to said second position and is free to pivot with said frame and when the boat is moved in the opposite direction on said roller, said roller shifts to said first position and is prevented by said stops from pivoting with respect to said base.

2. The guide roller device of claim 1 which also comprises stop means limiting the extent of pivotal movement of said frame with respect to said base when said roller is in said second position.

3. The guide roller device of claim 2 in which said stop means comprises at least one pair of generally opposed pockets with a ballbearing received therein, one of the pockets of each pair carried by said base and the other pocket of each pair carried by said frame.

4. The guide roller device of claim 3 in which said pockets are spaced from said pivotal axis of said frame and at least one of said pockets of each pair is elongate and extends generally longitudinally substantially on a radius of said pivotal axis of said frame and said ballbearing is adapted to transmit a portion of the load carried by said frame to said base.

5. The guide roller device of claim 1 in which said roller is mounted on a pin for rotation about its longitudinal axis and the opposed ends of said pin are received in elongate slots in said frame for generally transverse movement of said roller to said first and second positions.

6. The guide roller device of claim 5 in which said slots are inclined such that the longitudinal center line of said pin is closer to said base when said pin is in said first position than when said pin is in said second position in said slots.

7. The guide roller of claim 1 in which said base is of sheet metal with generally spaced opposed sidewalls interconnected by an integral center panel with a tongue folded between the sidewalls to provide a base plate carrying said frame.

8. The guide roller device of claim 1 in which said frame is a generally U-shaped sheet metal bracket with spaced opposed sidewalls, and in which said roller is mounted for rotation on the longitudinal axis of a pin, the opposed ends of said pin being received for generally transverse movement in a pair of diametrically opposed elongate slots in said sidewalls of said bracket adapted to allow said roller to move to said first and said second positions.

9. The guide roller device of claim 7 in which said frame is a generally U-shaped sheet metal bracket with spaced opposed sidewalls, and in which said roller is mounted for rotation on the longitudinal axis of a pin, the opposed ends of said pin being received for generally transverse movement in a pair of diametrically opposed elongated slots in said sidewalls of said bracket adapted to allow said roller to move to said first and said second positions.

10. The guide roller device of claim 1 in which said stops are adapted to engage said pin such that any load carried by said roller is transmitted directly to said base rather than through said frame when said pin is in said first position.

11. A guide roller device for a boat trailer comprising a sheet metal base with spaced opposed sidewalls interconnected by an integral center panel having a continuous tongue folded between said sidewalls to provide a mounting plate adapted to support a swivel frame, a generally U-shaped sheet metal swivel frame having opposed spaced sidewalls and an integral base plate pivotally connected to said mounting plate of said base, a roller mounted on a pin for rotation about its longitudinal axis, the opposed ends of said pin being received in diametrically opposed elongate slots in said sidewalls of said swivel frame for movement of said roller in a direction generally transverse to both the longitudinal axis of the pin and the pivotal axis of said swivel frame to first and second generally transversely spaced positions, and a pair of stops adapted to engage said pin adjacent said pin's opposed ends when said pin is in said first position to prevent pivotal movement of said roller with respect to said base and to allow said roller to swivel with said frame when said roller is in said second position, said stops being integral with said opposed sidewalls of said base, whereby movement of a boat on said roller in one direction shifts said pin to said second position in said slots to allow said roller to swivel with said frame with respect to said base and movement of the boat in the opposite direction urges said pin to said first position in said slots and into engagement with said stops to prevent swiveling of said roller with respect to said base.

12. The guide roller of claim 11 which also comprises stop means limiting the pivotal movement of said frame with respect to said base when said pin is in said second position in said slots.

13. The guide roller of claim 12 in which said stop means comprises at least one pair of opposed pockets with one of said pockets of each pair carried by said base plate of said frame and the other of said pockets of each pair carried by said mounting plate of said frame, and a ballbearing received in said pair of pockets.

14. The guide roller device of claim 13 in which each pair of pockets is radially spaced from the pivot point of said swivel frame and at least one of the pockets of each pair is generally elongate and extends longitudinally generally on a radius of said pivot point with said ballbearing transmitting a portion of the load on said roller to said base when said roller is in said second position.

15. The guide roller device of claim 11 in which said stops are adapted to engage said pin such that any load carried by said roller is transmitted directly to said base rather than through said frame when said pin is in said first position.

* * * * *